United States Patent
Brundage et al.

(10) Patent No.: US 7,738,658 B2
(45) Date of Patent: *Jun. 15, 2010

(54) ELECTRONIC FORMS INCLUDING DIGITAL WATERMARKING

(75) Inventors: Trent J. Brundage, Sherwood, OR (US); Brett T. Hannigan, Menlo Park, CA (US)

(73) Assignee: Digimarc Corporation, Beaverton, OR (US)

( * ) Notice: Subject to any disclaimer, the term of this patent is extended or adjusted under 35 U.S.C. 154(b) by 529 days.

This patent is subject to a terminal disclaimer.

(21) Appl. No.: 11/688,682

(22) Filed: Mar. 20, 2007

(65) Prior Publication Data

US 2007/0242823 A1    Oct. 18, 2007

Related U.S. Application Data

(63) Continuation of application No. 10/407,816, filed on Apr. 3, 2003, now Pat. No. 7,194,106.

(51) Int. Cl.
*G09C 3/00*    (2006.01)
*G06K 9/46*    (2006.01)

(52) U.S. Cl. ................. 380/54; 382/243; 380/201

(58) Field of Classification Search ......... 382/112, 382/113, 116, 135, 136–140, 168, 189, 194, 382/203, 219, 232, 233, 235, 243, 250, 260, 382/274, 276, 321; 709/217; 380/201, 246, 380/54; 358/3.11; 399/366
See application file for complete search history.

(56) References Cited

U.S. PATENT DOCUMENTS

| | | | |
|---|---|---|---|
| 5,329,108 A | 7/1994 | Lamoure | |
| 5,385,371 A | 1/1995 | Izawa | |
| 5,692,073 A | 11/1997 | Cass | |
| 5,717,940 A | 2/1998 | Peairs et al. | |
| 5,765,176 A | 6/1998 | Bloomberg | |
| 5,893,908 A | 4/1999 | Cullen et al. | |
| 5,978,477 A | 11/1999 | Hull et al. | |
| 5,995,978 A | 11/1999 | Cullen et al. | |
| 6,006,226 A | 12/1999 | Cullen et al. | |
| 6,052,486 A * | 4/2000 | Knowlton et al. | 382/232 |
| 6,085,205 A | 7/2000 | Peairs et al. | |
| 6,122,403 A * | 9/2000 | Rhoads | 382/233 |
| 6,182,090 B1 | 1/2001 | Peairs | |

(Continued)

FOREIGN PATENT DOCUMENTS

EP    493 091    7/1991

(Continued)

OTHER PUBLICATIONS

Bloomberg, "Embedding Digital Data on Paper in Iconic Text" SPIE vol. 3027, Document Recognition IV, pp. 67-80 (1997).

(Continued)

*Primary Examiner*—Seyed Azarian

(57) ABSTRACT

The present invention relates to creating and managing electronic documents. In one implementation, a method includes obtaining electronic data corresponding to an application document to obtain a driver's license; analyzing the electronic data to detect steganographic indicia encoded therein, the steganographic indicia comprising a plural-bit identifier; and associating the plural-bit identifier with a plurality of different records associated with an applicant or the application document. Other implementations are provided as well.

21 Claims, 5 Drawing Sheets

U.S. PATENT DOCUMENTS

| | | | |
|---|---|---|---|
| 6,199,073 B1 | 3/2001 | Peairs et al. | |
| 6,311,214 B1* | 10/2001 | Rhoads | 709/217 |
| 6,332,031 B1* | 12/2001 | Rhoads et al. | 382/100 |
| 6,334,721 B1 | 1/2002 | Horigane | |
| 6,345,104 B1* | 2/2002 | Rhoads | 382/100 |
| 6,411,725 B1 | 6/2002 | Rhoads | |
| 6,466,329 B1 | 10/2002 | Mukai | |
| 6,522,770 B1 | 2/2003 | Seder et al. | |
| 6,577,746 B1 | 6/2003 | Evans et al. | |
| 6,901,236 B2* | 5/2005 | Saitoh et al. | 399/366 |
| 6,917,691 B2 | 7/2005 | Evans et al. | |
| 7,010,144 B1 | 3/2006 | Davis et al. | |
| 7,042,470 B2 | 5/2006 | Rhoads et al. | |
| 7,058,697 B2 | 6/2006 | Rhoads | |
| 2001/0016852 A1 | 8/2001 | Peairs et al. | |
| 2001/0043362 A1 | 11/2001 | Hull et al. | |
| 2002/0037091 A1 | 3/2002 | Terasaki | |
| 2002/0075298 A1 | 6/2002 | Schena et al. | |
| 2002/0080396 A1 | 6/2002 | Silverbrook et al. | |
| 2002/0161710 A1 | 10/2002 | Furukawa | |
| 2002/0169962 A1 | 11/2002 | Brundage et al. | |
| 2003/0069852 A1 | 4/2003 | Martin et al. | |

FOREIGN PATENT DOCUMENTS

| | | |
|---|---|---|
| JP | 8-50598 | 2/1996 |
| WO | WO 96/31049 | 10/1995 |

OTHER PUBLICATIONS

Johnson, et al., "Bridging the Paper and Electronic Worlds: The Paper User Interface", Interchi '93. pp. 507-512, Apr. 1993.

Newman, William et al. "A Desk Supporting Computer-Based Interaction with paper Documents," ACM Conference on Human Factors in Computing Systems (CHI '92) May 3-7, 1992, pp. 587-592.

Peairs, "Iconic Paper," Proceedings of the Third International Conference on Document Analysis and Recognition (ICDAR '95), pp. 1174-1179, 1995.

Rao, et al. "Protofoil: Storing and Finding the Information Worker's Paper Documents in an Electronic File Cabinet," Human Factors in Computing Systems (CHI '94), pp. 180-186, Boston, MA, Apr. 1994.

Whittaker et al., "Back to the Future: Pen and Paper Technology Supports Complex Group Coordination," CHI '95, Conference on Human Factors in Computing Systems, Denver, Colorado (May 7-11, 1995) (text copy obtained from ACM).

* cited by examiner

Mortgage Application Form

Name _____

Address _____

_____

Social Security Number ☐ — ☐ — ☐

Occupation _____

_____
Signature

Mortgage Application Form

Name ▓▓▓▓▓▓▓▓▓▓▓▓▓▓▓▓▓▓▓▓ (12a)

Address ▓▓▓▓▓▓▓▓▓▓▓▓▓▓▓▓▓▓▓▓ (12b)
▓▓▓▓▓▓▓▓▓▓▓▓▓▓▓▓▓▓

Social Security Number ▓▓▓▓ — ▓▓▓ — ▓▓▓▓ (12c)

Occupation ▓▓▓▓▓▓▓▓▓▓▓▓▓▓▓▓▓ (12d)

▓▓▓▓▓▓▓▓▓▓▓▓▓▓▓▓▓▓▓▓ (12e)
Signature

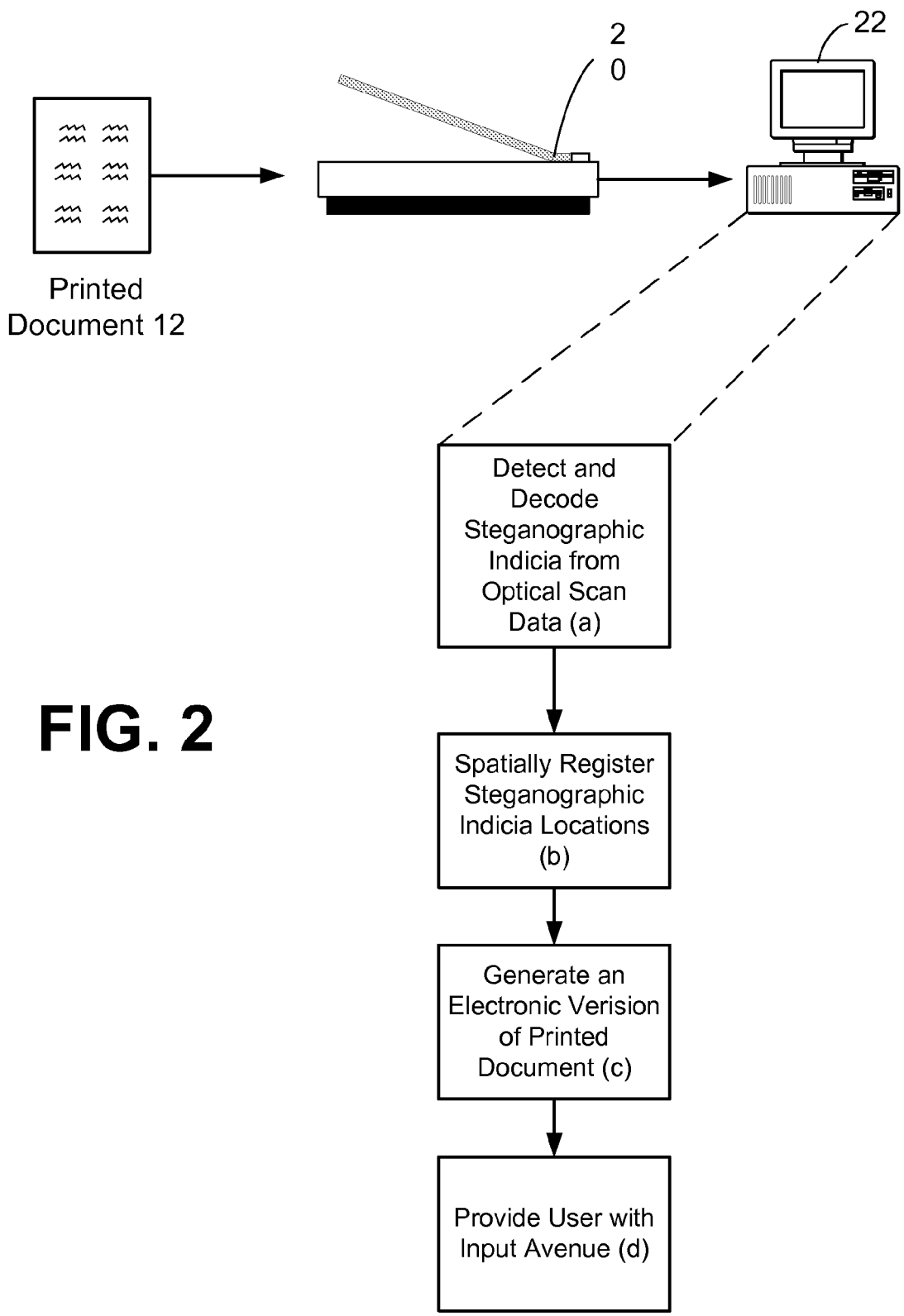

ELECTRONIC FORMS INCLUDING DIGITAL WATERMARKING

RELATED APPLICATION DATA

This application is a continuation of U.S. patent application Ser. No. 10/407,816, filed Apr. 3, 2003 (now U.S. Pat. No. 7,194,106). The present application is related to the following U.S. patent application Ser. No. 09/629,401, filed Aug. 1, 2000 (now U.S. Pat. No. 6,522,770); Ser. No. 09/571,422, filed May 15, 2000 (now U.S. Pat. No. 6,947,571); and Ser. No. 10/359,550, filed Feb. 5, 2002 (now U.S. Pat. No. 7,162,052). Each of these U.S. patent documents is hereby incorporated by reference.

FIELD OF THE INVENTION

The present invention relates to steganography, and is particularly illustrated in the field of documents and printed forms.

BACKGROUND AND SUMMARY OF THE INVENTION

One form of steganography is digital watermarking. Digital watermarking systems typically have two primary components: an encoder that embeds a watermark in a host media signal, and a decoder (or reader) that detects and reads the embedded watermark from a signal suspected of containing a watermark. The encoder embeds a watermark by altering the host media signal. The decoding component analyzes a suspect signal to detect whether a watermark is present. In applications where the watermark encodes information, the decoder extracts this information from the detected watermark.

One challenge to the developers of some watermark embedding and reading systems is to ensure that the watermark is detectable even if the watermarked media content is transformed in some fashion. The watermark may be corrupted intentionally, so as to bypass its copy protection or anti-counterfeiting functions, or unintentionally through various transformations (e.g., scaling, rotation, translation, etc.) that result from routine manipulation of the content. In the case of watermarked images, such manipulation of the image may distort the watermark pattern embedded in the image.

A watermark can have multiple components, each having different attributes. To name a few, these attributes may include function, signal intensity, transform domain of watermark definition (e.g., temporal, spatial, frequency, etc.), location or orientation in host signal, redundancy, level of security (e.g., encrypted or scrambled), etc. The components of the watermark may perform the same or different functions. For example, one component may carry a message, while another component may serve to identify the location or orientation of the watermark. Moreover, different messages may be encoded in different temporal or spatial portions of the host signal, such as different locations in an image or different time frames of audio or video. In some cases, the components are provided through separate watermarks.

There are a variety of implementations of an embedder and detector. One embedder performs error correction coding of a binary message, and then combines the binary message with a carrier signal to create a component of a watermark signal. It then combines the watermark signal with a host signal. To facilitate detection, it may also add a detection component to form a composite watermark signal having a message and detection component. The message component may include known or signature bits to facilitate detection, and thus, serves a dual function of identifying the mark and conveying a message. The detection component is designed to identify the orientation of the watermark in the combined signal, but may carry an information signal as well. For example, the signal values at selected locations in the detection component can be altered to encode a message.

One detector implementation estimates an initial orientation of a watermark signal in a host signal, and refines the initial orientation to compute a refined orientation. As part of the process of refining the orientation, this detector computes at least one orientation parameter that increases correlation between the watermark signal and the host signal when the watermark or host signal is adjusted with the refined orientation.

Another detector computes orientation parameter candidates of a watermark signal in different portions of the target signal, and compares the similarity of orientation parameter candidates from the different portions. Based on this comparison, it determines which candidates are more likely to correspond to a valid watermark signal.

Yet another detector estimates orientation of the watermark in a target signal suspected of having a watermark. The detector then uses the orientation to extract a measure of the watermark in the target. It uses the measure of the watermark to assess merits of the estimated orientation. In one implementation, the measure of the watermark is the extent to which message bits read from the target signal match with expected bits. Another measure is the extent to which values of the target signal are consistent with the watermark signal. The measure of the watermark signal provides information about the merits of a given orientation that can be used to find a better estimate of the orientation. Of course other embedder and detectors can be suitably interchanged with some embedding/detecting aspects of the present invention.

Some techniques for embedding and detecting watermarks in media signals are detailed in the assignee's co-pending U.S. patent application Ser. No. 09/503,881 (now U.S. Pat. No. 6,614,914), U.S. Pat. No. 6,122,403 and PCT patent application PCT/US02/20832. Each of these patent documents is herein incorporated by reference. Of course, artisans know many other suitable watermarking and steganographic encoding techniques.

In related patent application Ser. No. 09/629,401 (now U.S. Pat. No. 6,522,770) assignee disclosed systems and methods for linking from a printed document to an electronic version of the printed document. In one implementation a steganographic signal includes data which is used to determine a memory location at which the electronic version is stored.

According to one aspect of the present invention, we provide documents, systems and methods for creating an electronic version of a printed document. Instead of linking to or finding an electronic version in memory, our systems and methods create a corresponding electronic document itself at least in part by reference to steganographic data included on the printed document. In one implementation we use digital watermark data to help locate areas on a form in which information (e.g., name and address) is to be filled in. The relative locations of the printed document areas are mapped to a generated electronic document. Editable text boxes (or editable areas or fields) are provided at the relative electronic document areas. A user enters information in the editable text boxes or fields.

According to another aspect of the invention, we provide a printed document including steganographic indicia thereon. An example of the printed document is a form to be filled out by a user or applicant, such as a mortgage form. The indicia corresponds to an area on the document to be filled out (e.g., name or social security number, etc.). The indicia preferably provides relative location clues for the area with respect to the document or with respect to other indicia. The indicia also may indicate a field length or expected data input (e.g., numbers vs. letters, etc.). Thus, the indicia provides clues on how best to generate an electronic version corresponding to the printed document.

According to still another aspect of the invention, we provide a system to generate an electronic version of a printed document. The printed document includes steganographic encoding thereon. The encoding including at least a first identifier associated with a first printed document area and a second identifier associated with a second printed document area. The system includes memory; electronic processing circuitry; and a communications bus to facilitate communication between the memory and the electronic processing circuitry. The memory includes software instructions stored therein, the instructions comprising instructions to: generate an electronic version of the printing document including a first electronic document area and a second electronic document area; and relatively position the first electronic document area and the second electronic document area within the electronic version in accordance to a relative positioning of the first printed document area and the second printed document area within the printed document, wherein the relative positioning is determined at least in part from the steganographic encoding.

The foregoing and other features and advantages of the present invention will be even more readily apparent from the following detailed description, which proceeds with reference to the accompanying drawings.

BRIEF DESCRIPTION OF THE DRAWINGS

FIG. 1A illustrates a conventional printed document.

FIG. 1B illustrates a printed document including machine-readable indicia selectively provided in document areas.

FIG. 2 illustrates an electronic document generation system and method according to one aspect of the present invention.

DETAILED DESCRIPTION

A printed document 10 is shown with reference to FIG. 1A. The printed document 10 corresponds to a form or document to be completed by a user or applicant, such as a mortgage application form. An all-too familiar scenario involves a user receiving the form in the mail and then handwriting information requested by the form (e.g., name, address, social security number, occupation, etc.). (We hesitate to point out the obvious, but gone are the days when users have typewriters to help complete the form.) Countless printed documents are discarded or scratched out due to poor penmanship or writing mistakes. Once completed, the user signs the document and returns (e.g., typically via mail or fax) the completed form to the form's provider.

We have improved this age-old process through machine-readable, steganographic encoding.

With reference to FIG. 1B, our printed document 12 includes a plurality of areas 12a-12e each having machine-readable indicia provided therein. The printed document 12 may include, e.g., a loan application, account application, brokerage form, mortgage application, rental agreement, contract, employment application, questionnaire, entry form, certificate, contest documentation, checks, travelers checks, security documents, identification documents, government documentation (e.g., voter registration form, social security benefits form, etc.), change of address form, legal documentation, driver's license application, etc., etc. The machine-readable indicia preferably includes steganographic encoding. The steganographic encoding is preferably subtle, e.g., the encoding is generally imperceptible to human viewers of the encoding, but remains machine-readable with computer analysis. In some implementations, however, the encoding is in the form of a visible tint, texture or background pattern. In these implementations, the tint, texture or pattern may be visually perceptible, but the encoding itself is still generally imperceptible to a human viewer of the tint or background pattern, unlike a bar code. (For example, a human viewer recognizes that a bar code is a marking or encoding, even though they may not be able to decipher the marking or encoding without the aid of computer analysis. However, the human viewer would not necessary recognize that our steganographic encoding represents a marking or encoding.). In some implementations the steganographic encoding includes one or more digital watermarks. Some digital watermarking techniques make slight changes to a pattern, e.g., by changing data representing the pattern, whether in the form of DCT coefficients, wavelet coefficients, pixel values, or other interchangeable representation—to thereby encode auxiliary information. Other implementations provide so-called "pure" or "raw" digital watermarking signals as a tint or pattern.

Figure 3:
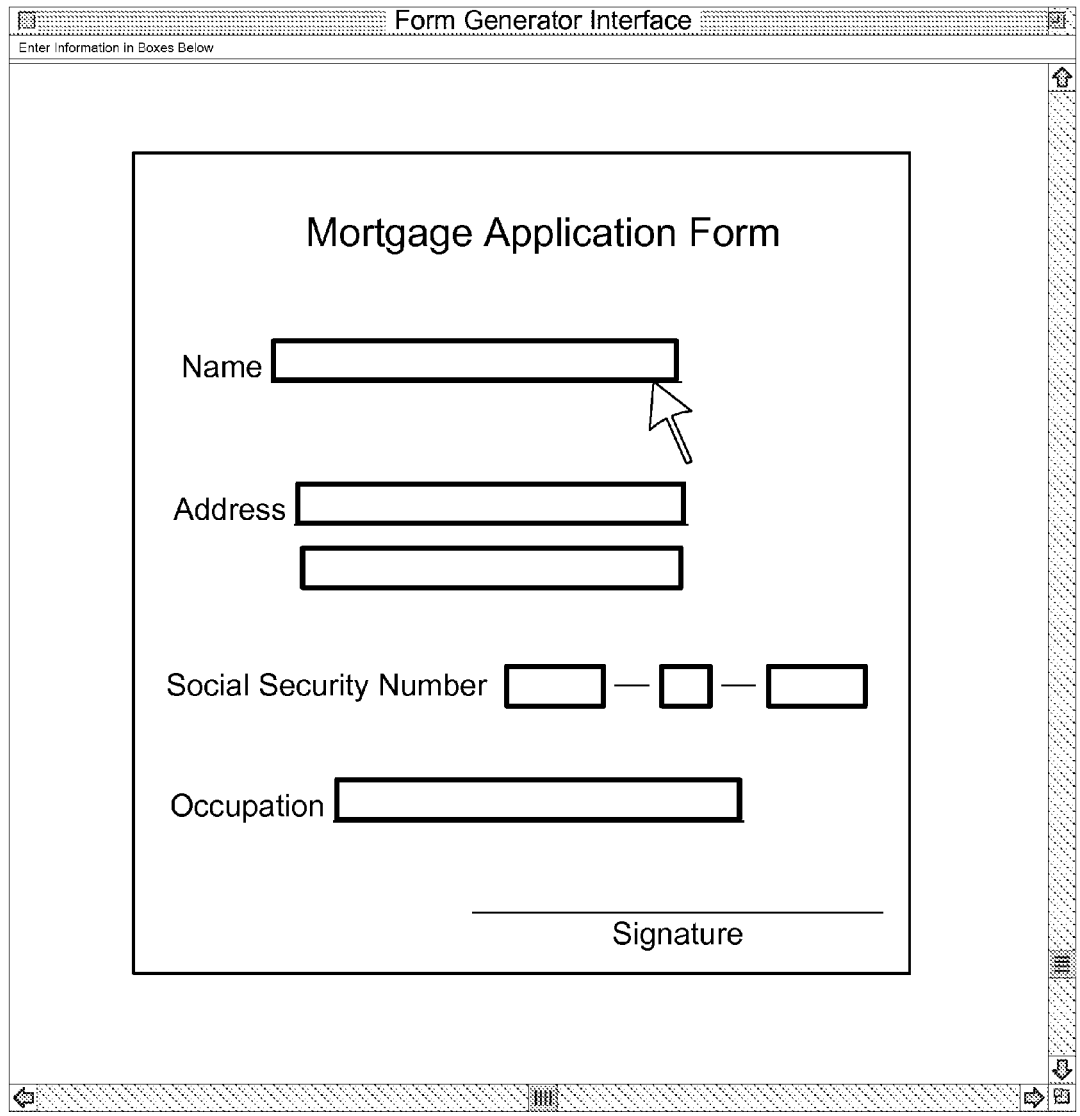
FIG. 3 illustrates a computer-generated graphical interface allowing for data entry in an electronic version of the printed document illustrated in FIG. 1B.

The steganographic encoding preferably conveys a message or payload. The message or payload may vary from area to area. For example, the message or payload includes a unique identifier for identifying a type of area or a specific protocol or standard for an area or printed document 12. If the message or payload represents a protocol or standard, a form generator can use the message to help place and regulate, e.g., editable text boxes or fields within an electronic version of the printed document. (A document or form generator is discussed below with reference to FIGS. 2 and 3.) Or the message or payload may provide a field type or length indictor. For example, the payload may correspond to an area 12c (FIG. 1B) in which a user should enter her social security number. The payload may indicate that numeric characters are expected, and that the field length should be nine (9) numbers. A form generator can use this payload data to regulate a user's inputted information. Or the payload may correspond to an area 12a (FIG. 1B) in which a user should enter her name. The payload in this case may indicate that text characters are expected.

The encoding may also include an orientation component which is useful in helping to resolve image distortion such as rotation, scaling, and translation, etc., and/or to help detect the message or payload. The orientation component may be a separate signal, or may be combined (or concatenated) with the message or payload.

The encoding may also be redundantly embedded throughout a document area 12a-12e so as to redundantly convey the payload and/or orientation component.

With reference to FIG. 2, printed document 12 is presented to an optical sensor 20 such as a flat bed scanner, web camera, cell phone camera, digital camera, CCD sensor, etc. Optical sensor 20 captures image data (also referred to as "optical scan data") corresponding to printed document 12. The image data is communicated to computer 22. It should be appreciated that optical sensor 20 may be tethered to computer 22 or may wirelessly communicate with computer 22. In other implementations sensor 20 communicates over a network with computer 22.

Computer 22 includes at least memory and electronic processing circuitry. A communications system bus will generally be used to help facilitate data communication in computer 22. Computer 22 includes steganographic decoding software (e.g., digital watermark decoding software) stored in memory for execution on the electronic processing circuitry. The steganographic decoding software analyzes the captured image data in search of steganographic indicia (step a). The decoding software identifies a relative spatial positioning of the steganographic encoding within the printed document 12 (step b). The positioning (and relative size and/or area encoded) of the steganographic encoding can be determined, e.g., relative to a printed document 12 corner (e.g., the upper-left corner of the printed document 12) or other document location. In some implementations, we scan the captured image data looking for steganographic encoding in a raster-like manner (or looking at an image block-by-block). Once the encoding is found at a raster or block location, a spatial location or area boundary can be identified. In one implementation we determine a boundary for the encoding in terms of pixel locations relative to a fixed document position or document area. In another implementation the steganographic encoding carries data conveying the relative size or a corresponding area (or electronic field positioning) and/or the relative positioning of the area within the printed or electronic document. In other implementations (see FIG. 4) a printed document 40 includes one or more fiducials 42. For example, a relative X & Y pixel or spatial distance from an encoded area or boundary is determined with respect to fiducial 42. Placement of encoded areas 12a-12e is determined relative to the one or more fiducials 42. In still other implementations, the steganographic encoding includes a form indicator. The form indicator is used to index a data record which includes information regarding relative placement of a text box or field. For example, the form indicator may correspond to form 13—a loan application. The data record includes data to help construct an electronic version of the loan application, such as field placement information.

We generate an electronic version of the printed document 12 (step c) and present the electronic version (e.g., to a user) for data entry (step d). Generating an electronic version of the printed document 12 can be achieved using many different techniques. For example, in a HTML-based system we can use at least some of the captured image data as a background image (or as an image overlay). We then use the steganographic data (or information derived from such data) to help us correctly position editable text boxes or fields over the background image. A user can use an Internet browser (e.g., Explorer) to complete the printed form (see FIG. 3). For example, the user enters information in provided editable text boxes (e.g., name, address, social security number, occupation, etc.). In another implementation, we use a word processor (e.g., Word) as our base program to generate an electronic version of the printed document. The word processor can use some or all of the captured image data (corresponding to the printed document) as a background image or overlay for an electronic version of the printed document. Or an OCR program can capture text and relative positioning of the text from the printed document. The steganographic data is used to help position character fields within the electronic version of the printed document to receive user data. The selected portions of the electronic version can be write-protected to ensure data entry only in fields corresponding to areas 12a-12e. As mentioned above, the steganographic data can be used to convey a type (or length) of anticipated information for a particular field. The base program (or a plug-in cooperating with the base program) can use the steganographic data to limit text to a specific type (e.g., numbers) or to prompt a user to type in correct data (e.g., numbers instead of letters, or only 9 characters instead of 12 characters, etc.).

In still another implementation, our computer 22 includes a so-called Tablet PC. The Tablet PC includes a touch screen (e.g., coupled with handwriting recognition software) that allows a user to "write" on an electronic version of the printed document 12 as displayed on the touch screen. The handwriting is converted into a type font by the handwriting recognition software and the electronic version of the printed document 12 is ready for printing or transmitting. (In some implementations steganographic encoding may include routing information such as an email address, IP address, URL, fax number, etc. This routing information can be used to transmit the electronic version once completed.).

Figure 4:
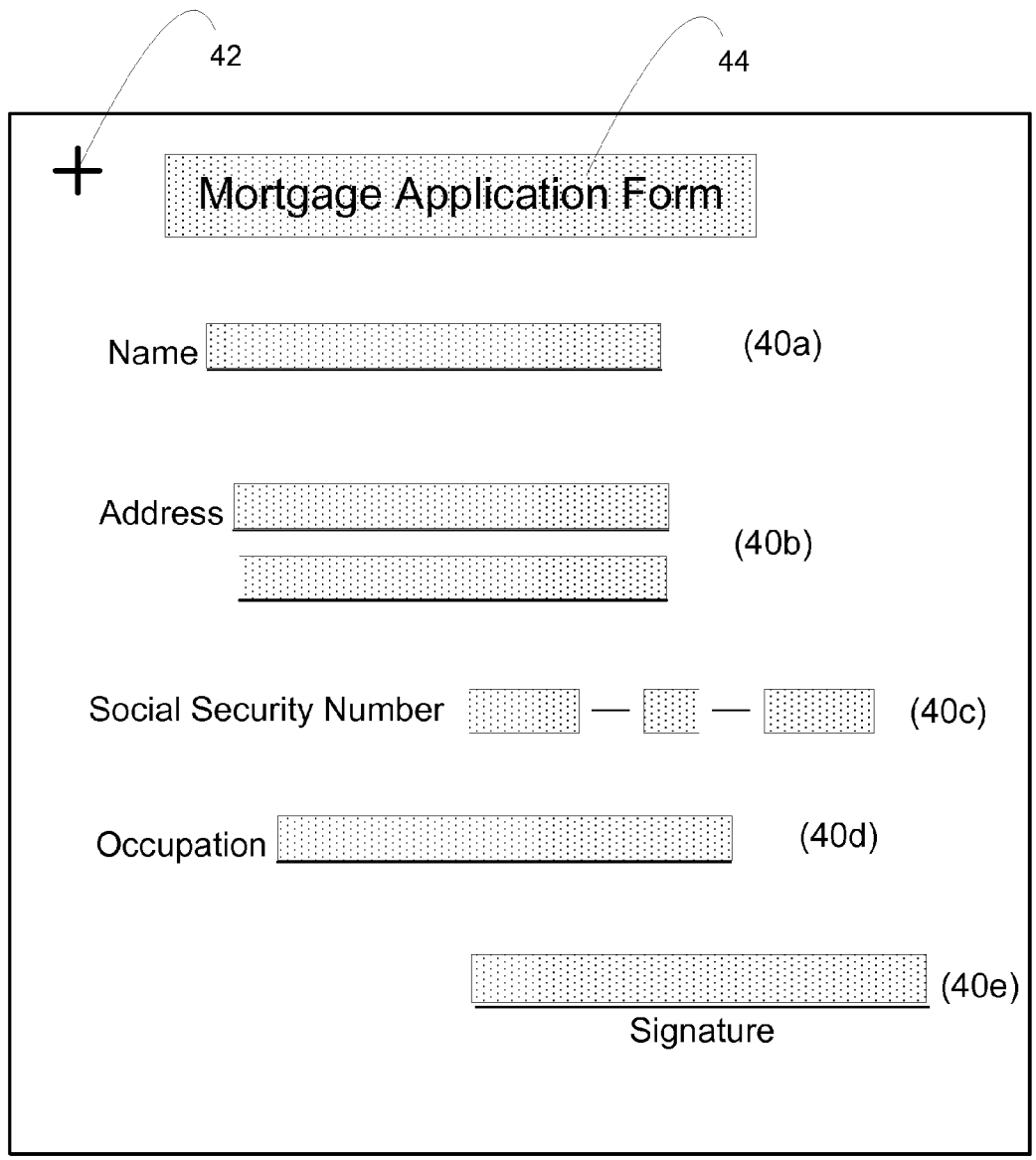
FIG. 4 illustrates another printed document including machine-readable indicia and a reference fiducial.

With reference to FIG. 4, we optionally provide an identifying steganographic encoded area 44 somewhere on the printed document 40. This identifying steganographic encoding provides data that can be used to identify a "type" of printed document. For example, the steganographic data may include plural bit data to be used by a steganographic decoder or software application/plug-in as a clue to launch an electronic form generator program. We envision a scenario where the steganographic decoder or software application/plug-in constantly searches for this plural bit data, and once found, launches the electronic form generator, whether it be HTML, word processor or other application based. The plural-bit data can also be used to indicate which type of printed document the form generator should generate. For example, the plural-bit data may correspond to a predetermined template or to a predetermine set of electronic form fields. The form generator can use the template or field set to generate the electronic form. Thus, in some implementations, printed document 40 may not even include encoding in areas 40a-40e. We note that in alternative implementations, the type or indicator plural-bit data is included in one of the areas 40a-40e, instead of in a separate form area 44. In still another implementation, a user launches an electronic form generator on a computer and then proceeds to electronically capture printed document 40 (or 12). The electronic generator cooperates with (or includes) a steganographic decoder to generate a corresponding electronic version of the printed document.

In some implementations a steganographic payload includes a tag or field name to be used with Extensible Markup Language (XML) files. For example, if the payload corresponds to an area (e.g., 40a in FIG. 4) associated with a "name", the XML tag may include the descriptor: "Name". A form generator can use the descriptor when creating an XML file associated with an electronic version of a printed document. Then, when a user enters information associated with an electronic field associated with area 40a, the user's information can be stored in the tag or descriptor line titled "Name". (In an alternative implementation, instead of a payload including a tag or descriptor, we include an index in the payload. Once decoded, the index can be used to access a table or data record including a set of tags or descriptors. The index is used to interrogate the table or data record to find the corresponding tag or descriptor.).

Now consider a likely execution scenario. A user receives a printed document 12. The user then presents the print document 12 to optical sensor 20 (FIG. 2) for image capture. Steganographic decoding software recognizes the steganographic machine-readable code and an electronic form generator is launched. (In some cases the electronic form generator includes the steganographic decoder). An electronic version of the printed document is constructed, which allows a user to enter information in the electronic version. Once the electronic form is completed, the completed electronic form can be electronically stored. In one implementation, we store the electronic version (or information input from the user) as an XML file. XML file fields represent at least the user's inputted information, perhaps with a relative spatial alignment or field indicator (e.g., social security number or name) of the inputted information. In some cases the XML file will reference (or include) a background or overlay image. If the steganographic encoding includes routing information, such information can also be stored as an XML field. Or we can store the completed form as a file that corresponds to the host program. For example, if using Word as the host program we store the completed form as a Word file, or if we are using an editable .PDF format, the completed form is stored as a .PDF file. The user prints out the completed form for signing.

We can embed additional steganographic information to be printed with the completed form. The additional steganographic information may include a form identifier or memory address. Once signed, the executed form can be presented to an optical sensor for image capture. A steganographic decoder obtains the form identifier from the signed, captured form. The form identifier can be used, e.g., to locate the stored, completed electronic version. (See, e.g., assignee's U.S. Pat. No. 6,522,770, which is herein incorporated by reference, for related techniques). For example, if the completed version is stored as an XML file, the form identifier can be used to locate the corresponding XML file. In some implementations, we capture a bit-map image of the user's signature. The bit-map is associated with the XML file. The XML and the associated bit-map can then be electronically transmitted to, e.g., the provider of the original printed document 12 (or 40). We can optionally encrypt the XML file and/or bit-map for additional security.

The above print-out-for-signature-and-then-rescan example can be circumvented in several other implementations. For example, the user can sign the printed document 12 (or 40) prior to the initial image capture. Or, if using, e.g., a Tablet PC, the user can sign the completed electronic form on the Tablet PC screen, and then electronically transmit the form without needing to print the electronic version for a signature.

In another implementation, instead of printing a completed electronic form, we provide user inputted information, along with a relative orientation or positioning of the information (e.g., where the information should be printed on a printed document), to a printer. The original printed document is feed into the printer to receive the user-inputted information. As long as the registration of the user inputted information to be printed and the printed document feed path are reasonably correlated, the original printed document should receive the printed user input in the appropriate locations. This implementation is helpful in scenarios requiring the original document, such as some product registrations, government paperwork, legal documents, etc.

In a related implementation a printer includes an optical sensor. The printer's optical sensor reads an original printed document to determine the type of field represented by steganographic indicia. (For example, the indicia may include an XML descriptor, and the type of field is evidenced by the XML descriptor). The printer receives user-inputted information (e.g., from a form generator). The user inputted information includes type of field indicators (e.g., XML descriptors or tags). The printer (or a print controller) matches the user-inputted information with the appropriate printed document location and applies printing to those locations.

We imagine that in some implementations not every printed document (e.g., document 10 in FIG. 1) will include steganographic encoding. In these implementations a user can apply encoding prior to image capture. For example, a user may apply "stickers" including steganographic or machine-readable encoding. The stickers are applied over areas in which the user intends to enter information. The alignment and positioning of the stickers on the printed document 10 is determined and a suitable electronic version of document 10 is generated.

Concluding Remarks

To provide a comprehensive disclosure without unduly lengthening this specification, applicant incorporates by reference the above-cited U.S. patent documents.

Having described and illustrated the principles of the invention with reference to illustrative embodiments, it should be recognized that the invention is not so limited. The present invention finds application beyond such illustrative embodiments.

For example, the technology and solutions disclosed herein have made use of elements and techniques known from the cited documents. Other elements and techniques from the cited documents can similarly be combined to yield further implementations within the scope of the present invention. Thus, for example, single-bit watermarking can be substituted for multi-bit watermarking, local scaling of watermark energy can be provided to enhance watermark signal-to-noise ratio without increasing human perceptibility, various filtering operations can be employed to serve the functions explained in the prior art, watermarks can include subliminal graticules to aid in image re-registration, encoding may proceed at the granularity of a single pixel (or DCT coefficient), or may similarly treat adjoining groups of pixels (or DCT coefficients), the encoding can be optimized to withstand expected forms of content corruption. Etc., etc., etc. Thus, the exemplary embodiments are only selected samples of the solutions available by combining the teachings referenced above. The other solutions necessarily are not exhaustively described herein, but are fairly within the understanding of an artisan given the foregoing disclosure and familiarity with the art.

The implementation of some of the functionality described above (including watermark or steganographic encoding and decoding) is straightforward to artisans in the field, and thus not further belabored here. Conventionally, such technology is implemented by suitable software, stored in long-term memory (e.g., disk, ROM, etc.), and transferred to temporary memory (e.g., RAM) for execution on an associated processor or processing circuitry. In other implementations, the functionality can be achieved by dedicated hardware, or by a combination of hardware and software. Reprogrammable logic, including FPGAs, can advantageously be employed in certain implementations.

In view of the wide variety of embodiments to which the principles and features discussed above can be applied, it should be apparent that the detailed embodiments are illustrative only and should not be taken as limiting the scope of the invention. Rather, we claim as our invention all such modifications as may come within the scope and spirit of the following claims and equivalents thereof.

We claim:

1. A method comprising:
obtaining electronic data corresponding to a physical application document;

analyzing the electronic data to detect steganographic indicia encoded therein, the steganographic indicia comprising a plural-bit identifier;

based at least in part on detected steganographic indicia, generating an electronic version of the physical application document including a portion to receive requested application information from an applicant; and associating the plural-bit identifier with a plurality of records associated with the applicant or the physical application document.

2. The method of claim 1 wherein the physical application document comprises a driver's license application.

3. The method of claim 1 wherein the steganographic indicia comprises a spatial orientation that is used to help generate the electronic version of the physical application document.

4. The method of claim 1 wherein the steganographic indicia comprises a digital watermark.

5. The method of claim 1 wherein said generating comprises providing image data from the electronic data for use as at least one of a background or overlay image in the electronic version.

6. The method of claim 1 further comprising receiving user input and associating the user input in at least one of a first field and a second field in the electronic version.

7. The method of claim 6 further comprising storing the user input as an XML file.

8. The method of claim 1, further comprising associating second steganographic indicia with the electronic version, and printing the electronic version so as to include the second steganographic information.

9. The method of claim 8, wherein the second steganographic indicia is associated with the applicant or the physical application document.

10. A computer readable medium comprising instructions to cause an electronic processor to perform the method of claim 1.

11. The method of claim 1 wherein the steganographic indicia comprises data corresponding to a document template, and said act of generating uses the data to help create the electronic version in accordance with the template.

12. A programmed computing device comprising instructions stored in memory, said instructions are for causing said programmed computing device to perform the method of claim 1.

13. A method comprising:

obtaining electronic data corresponding to a physical application document;

analyzing the electronic data to detect steganographic indicia encoded therein, the steganographic indicia comprising a plural-bit identifier;

determining, based at least in part on the steganographic indicia, a relative location of a first area and a second area with respect to the printed document;

based at least in part on detected steganographic indicia, generating an electronic version of the physical application document including a portion to receive requested application information from an applicant, in which said generating utilizes at least the relative location of the first area and the second area to spatially position a first field and a second field within the electronic version, the first field and the second field comprising fields to receive user input; and associating the plural-bit identifier with a plurality of records associated with the applicant or the physical application document.

14. A computer readable medium comprising instructions to cause an electronic processor to perform the method of claim 13.

15. A programmed computing device comprising instructions stored in memory, said instructions are for causing said programmed computing device to perform the method of claim 13.

16. A method comprising:

obtaining electronic data corresponding to an application document to obtain a driver's license;

analyzing the electronic data to detect steganographic indicia encoded therein, the steganographic indicia comprising a plural-bit identifier;

associating the plural-bit identifier with a plurality of different records associated with the application document; and generating an electronic form based at least in part on the steganographic indicia, the electronic form comprising at least one field to receive user input.

17. The method of claim 16 wherein the steganographic indicia comprises at least one field type name or indicator.

18. The method of claim 17 wherein the at least one field type name or indicator comprises an XML descriptor or tag.

19. The method of claim 18 wherein user input is associated with the at least one XML descriptor or tag.

20. A computer readable medium comprising instructions stored thereon to cause an electronic processor to perform the method of claim 16.

21. A programmed computing device comprising instructions stored in memory, said instructions are for causing said programmed computing device to perform the method of claim 16.

* * * * *